(12) United States Patent
Tajima

(10) Patent No.: US 8,896,153 B2
(45) Date of Patent: Nov. 25, 2014

(54) ELECTRIC POWER SUPPLYING SYSTEM

(75) Inventor: Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 13/130,870

(22) PCT Filed: Nov. 12, 2009

(86) PCT No.: PCT/JP2009/069258
§ 371 (c)(1),
(2), (4) Date: May 24, 2011

(87) PCT Pub. No.: WO2010/070998
PCT Pub. Date: Jun. 24, 2010

(65) Prior Publication Data
US 2011/0233998 A1    Sep. 29, 2011

(30) Foreign Application Priority Data

Dec. 16, 2008    (JP) ................. 2008-319679

(51) Int. Cl.
*H02J 7/00* (2006.01)
*H04B 3/54* (2006.01)
*H04L 12/10* (2006.01)
*G06F 1/26* (2006.01)
*G06F 1/18* (2006.01)
*H01R 13/622* (2006.01)

(52) U.S. Cl.
CPC ............... *H04B 3/546* (2013.01); *H04L 12/10* (2013.01); *H04B 2203/5458* (2013.01); *H01R 13/622* (2013.01); *G06F 1/26* (2013.01); *G06F 1/189* (2013.01); *Y10S 439/9241* (2013.01)
USPC ............................... 307/66; 307/3; 439/924.1

(58) Field of Classification Search
None
See application file for complete search history.

(56) References Cited

U.S. PATENT DOCUMENTS

| | | | |
|---|---|---|---|
| 4,614,877 A * | 9/1986 | Knesewitsch et al. | 307/64 |
| 5,176,528 A * | 1/1993 | Fry et al. | 439/181 |
| 5,798,578 A * | 8/1998 | Thereze | 307/18 |
| 2005/0017846 A1* | 1/2005 | Butler et al. | 340/310.01 |
| 2006/0236013 A1 | 10/2006 | Okeda | |

FOREIGN PATENT DOCUMENTS

| | | |
|---|---|---|
| JP | 8-129693 | 5/1996 |
| JP | 2001-306191 | 11/2001 |
| JP | 2005-183273 | 7/2005 |
| JP | 2006-294007 | 10/2006 |

* cited by examiner

*Primary Examiner* — Jared Fureman
*Assistant Examiner* — Terrence Willoughby
(74) *Attorney, Agent, or Firm* — Sony Corporation

(57) ABSTRACT

An electric power supplying system includes at least two systems each including a bus line which is formed by at least two conductors and on which an information signal representing information is superimposed on electric power, a power supply server which is connected to the bus line and which supplies the electric power, and a client connected to the bus line to receive the supply of the electric power from the power supply server. The two systems are connected to each other by connecting the bus lines using conductors. The conductors include a connector having at least two electrodes that connect with each of the conductors. The connector has a structure in which, when the connector is connected to the bus line, one of the electrodes is connected to the bus line before the other of the electrodes.

18 Claims, 11 Drawing Sheets

ELECTRIC POWER SUPPLYING SYSTEM

TECHNICAL FIELD

The present invention relates to an electric power supplying system, and more specifically to an electric power supplying system that supplies information signals such that they are superimposed on electric power.

BACKGROUND ART

Many electronic devices, such as personal computers and game consoles, use an AC adapter that inputs alternating current (AC) electric power from a commercial power source and outputs electric power in accordance with the device, in order to operate and charge the device. Normally, electronic devices are operated using direct current (DC), and voltage and current are different according to each device. Therefore, a specification of the AC adapter to output electric power in accordance with the device also differs with each device. Thus, even if an AC adapter has a same kind of shape, there are problems with a lack of compatibility and an increase in a number of the AC adapters in line with an increase in the devices.

With respect to these kind of problems, a power source bus system has been proposed in which a power source supply block, which supplies electric power to a device such as a battery or an AC adapter, and a power consumption block, which is supplied with the electric power from the power source supply block, are connected to a single common direct current bus line (as disclosed, for example, in Patent Literature 1). In this power source bus system, direct current is flowing through the bus line. Further, in the power source bus system, each block itself is described as an object and each of the block objects mutually transmits and receives information (status data) via the bus line. In addition, each of the block objects generates information (status data) based on a request from another of the block objects, and transmits the status data as response data. Then, the block object that has received the response data can control the electric power supply and consumption based on the content of the received response data.

CITATION LIST

Patent Literature

Patent Literature 1: Japanese Patent Application Publication No. JP-A-2001-306191

SUMMARY OF INVENTION

Technical Problem

It is conceivable that such a power source bus system can be connected to another power source bus system by connecting the bus lines with each other. However, as electric power is output from the power source supply block to each of the power source bus systems at a specific timing, if the bus lines are suddenly connected to each other and the power source bus systems are connected, there is a problem in that the electric power outputs conflict with each other. If the electric power outputs conflict with each other, there is a risk that a client may receive electric power that is different to a specification, and this may interfere with a client operation.

The present invention is made in view of the above-mentioned issue, and aims to provide an electric power supplying system which is novel and improved, and which is capable of being connected to another electric power supplying system through mutual connection between bus lines, by providing a time difference between transfer of information and delivery of electric power.

Solution to Problem

According to the first aspect of the present invention in order to achieve the above-mentioned object, there is provided an electric power supplying system that includes at least two systems each including: a bus line which is formed by at least two conductors and on which an information signal representing information is superimposed on electric power; at least one power supply server which is connected to the bus line and which supplies the electric power; and at least one client which is connected to the bus line and which receives the supply of the electric power from the power supply server. The at least two systems are connected to each other by connecting the bus lines using conductors. The conductors include a connector having at least two electrodes that connect with each of the conductors forming the bus line. The connector has a structure in which, when the connector is connected to the bus line, one of the electrodes is connected to the bus line in advance of the other electrode.

Each of the above-described systems may further include a synchronous server that controls the supply of the electric power from the power supply server. The synchronous server may periodically transmit detection packets for detecting a connection with another of the systems, and when the synchronous server detects a detection packet transmitted by a synchronous server that is included in the other system, the synchronous server may stop transmission of the detection packets and notify the power supply server and the client included in the system of a change in the synchronous server.

Immediately before a period in which the electric power is supplied from the power supply server, the synchronous server may transmit a start packet that notifies a start of the supply of the electric power. Then, the client may receive the supply of the electric power from the power supply server based on reception of the start packet.

The electrode that is connected to the bus line in advance of the other electrode may be shorter than the other electrode.

A joint portion may be provided on the bus line, the joint portion having a screw hole and being joined with the connector when the connector is screwed in after being inserted into the screw hole. Only one of the conductors of the bus line may be connected by the joint portion when the connector is inserted into the joint portion, and the other conductor of the bus line may also be connected when the connector is screwed into the joint portion.

A female connector, into which the connector is inserted, may be provided on the bus line. Only one of the electrodes of the connector may be connected to the bus line when the connector is inserted into the female connector, and the other electrode may also be connected to the bus line when the connector is rotated by a predetermined angle in a state in which the connector is inserted.

Advantageous Effects of Invention

According to the present invention described above, an electric power supplying system can be provided that is novel and improved and that is capable of being connected to another electric power supplying system through mutual connection between bus lines, by providing a time difference between transfer of information and delivery of electric power.

Figure 1:
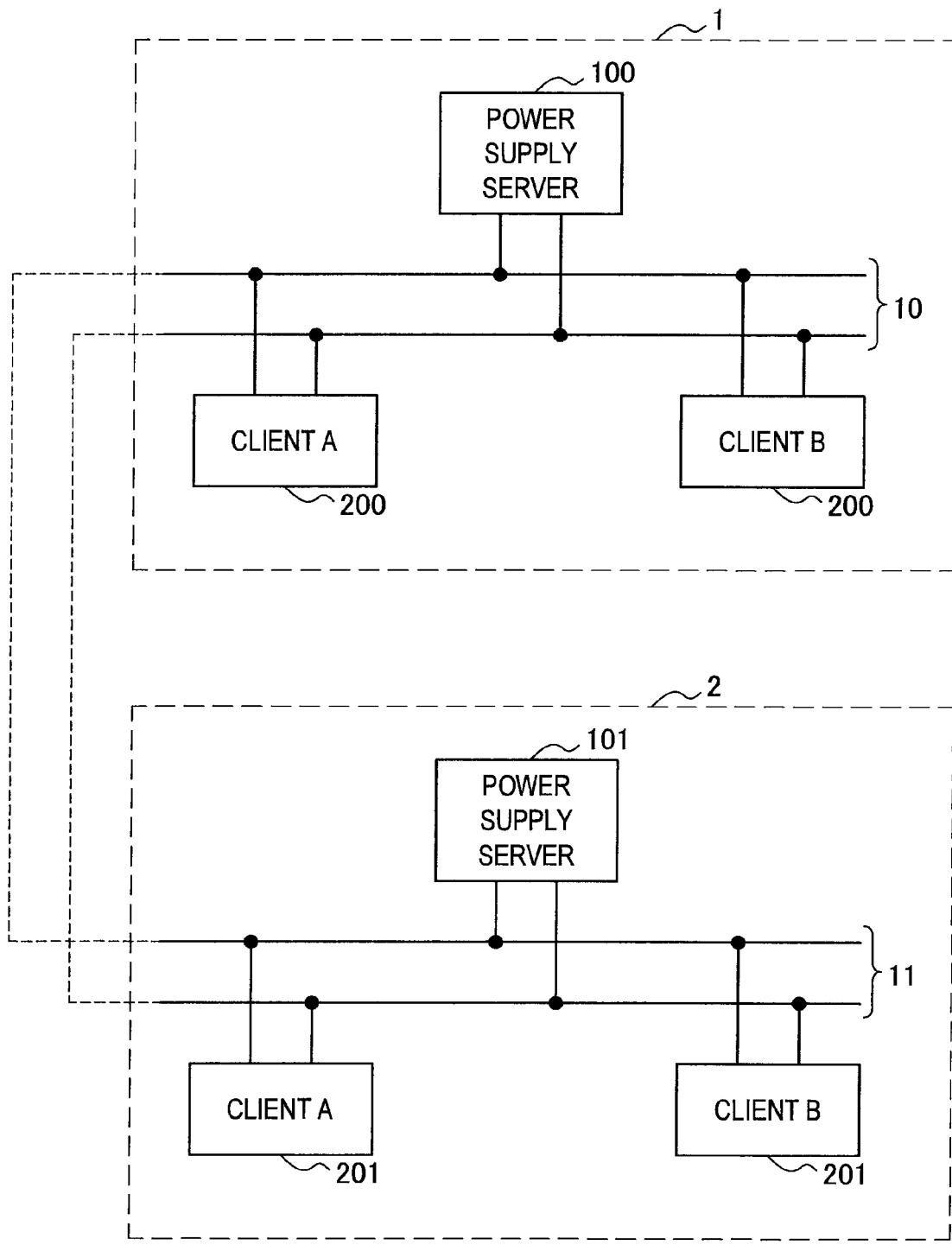
FIG. 1 is an explanatory diagram illustrating a structure of an electric power supplying system according to an embodiment of the present invention.

REFERENCE SIGNS LIST 1, 2 electric power supplying system
10, 11 bus line
10a, 10b, 11a, 11b conductor
12 jack
100, 101 power supply server
110 AC/DC converter
120 server controller
130 modem
140 inductor
150 switch
160 commercial power source
200, 201 client
210 DC/DC converter
220 client controller
230 modem
240 inductor
250, 260 switch
270 battery
280 load
300 connector
310, 311 pin
400, 450 connector
410, 460 contact
420, 470 shell portion
422, 472 insulation portion
430 screw
431, 432 screw groove
433 screw hole
500 connector
510 housing
520, 530 electrode hole
524 protruding portion
522, 532 female electrode
550 plug
560, 570 male electrode
562 protrusion

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the preferred embodiment of the present invention will be described in detail in the following order:

[1] Structure of electric power supplying system
[2] Structure of power supply server
[3] Structure of client
[4] Problem when connecting electric power supplying systems to each other
[5] Example of structure of connector to connect plurality of electric power supplying systems
[6] Example of communication protocol
[7] Modified examples of connector to connect plurality of electric power supplying systems
[8] Conclusion

[1] Structure of Electric Power Supplying System

First, a structure of an electric power supplying system according to an embodiment of the present invention will be described. FIG. 1 is an explanatory diagram illustrating the structure of the electric power supplying system according to the embodiment of the present invention. Hereinafter, the structure of the electric power supplying system according to the embodiment of the present invention will be explained with reference to FIG. 1.

As shown in FIG. 1, an electric power supplying system 1 according to the embodiment of the present invention includes a power supply server 100 and clients 200. The power supply server 100 and the clients 200 are connected via a bus line 10. Similarly, an electric power supplying system 2 according to the embodiment of the present invention includes a power supply server 101 and clients 201. The power supply server 101 and the clients 201 are connected via a bus line 11.

The power supply server 100 supplies direct current electric power to the clients 200. Further, the power supply server 100 transmits and receives information signals to and from the clients 200. In the present embodiment, the bus line 10 is commonly used both for the supply of direct current electric power and the transmitting and receiving of information signals between the power supply server 100 and the clients 200. In the electric power supplying system 2, a relationship between the power supply server 101 and the clients 201 is the same as the relationship between the power supply server 100 and the clients 200 in the electric power supplying system 1. A structure of the power supply server 100 will be explained below.

The clients 200 receive the supply of direct current electric power from the power supply server 100. Further, the clients 200 transmit and receive the information signals with the power supply server 100. A structure of the client 200 will be explained below.

Note that the single power supply server 100 and two of the clients 200 are exemplified in the electric power supplying system 1 shown in FIG. 1, but it is needless to say that in the present invention, a number of the power supply servers and a number of the clients are not limited to this example. This similarly applies to the power supply server 101 and the clients 201 of the electric power supplying system 2.

Above, the structure of the electric power supplying system according to the embodiment of the present invention is explained using FIG. 1. Next, a structure of the power supply server 100 according to the embodiment of the present invention will be explained.

[2] Structure of Power Supply Server

Figure 2:
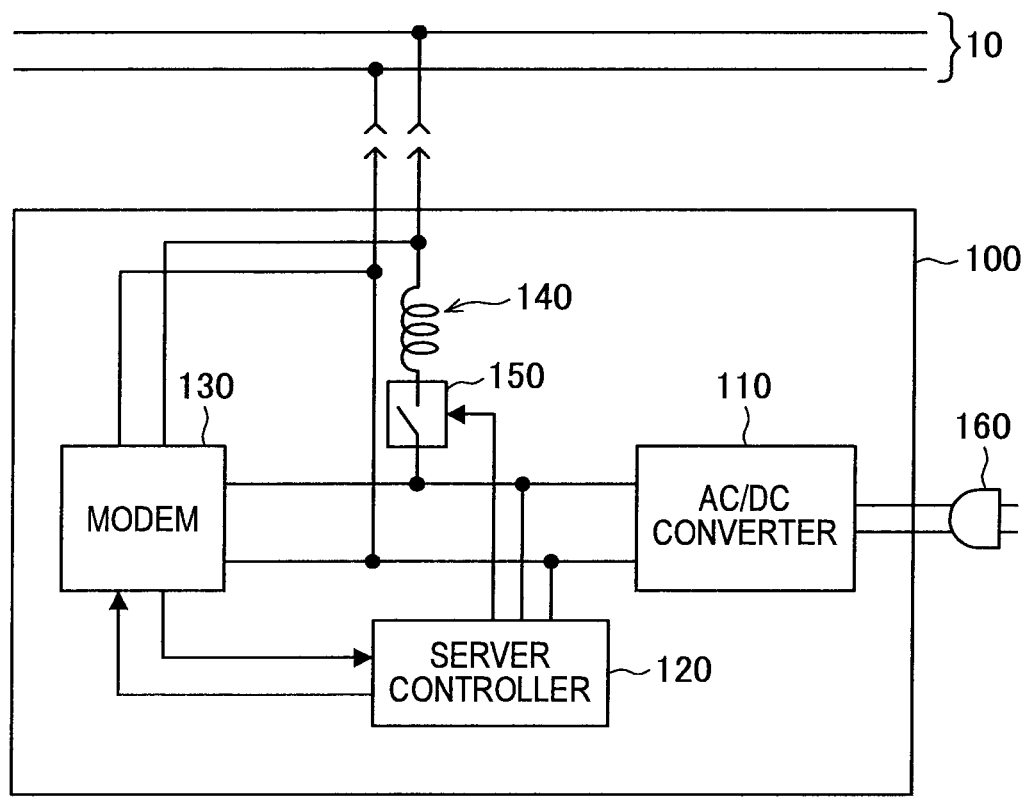
FIG. 2 is an explanatory diagram illustrating a structure of a power supply server 100 according to the embodiment of the present invention.

FIG. 2 is an explanatory diagram illustrating the structure of the power supply server 100 according to the embodiment of the present invention. Hereinafter, the structure of the power supply server 100 according to the embodiment of the present invention will be explained with reference to FIG. 2.

As shown in FIG. 2, the power supply server 100 according to the embodiment of the present invention includes an AC/DC converter 110, a server controller 120, a modem 130, an inductor 140 and a switch 150.

The AC/DC converter 110 is an alternating current/direct current converter portion that converts alternating current electric power supplied from a commercial power source 160 to direct current electric power such that it can be supplied to the client 200. The electric power that has been converted from alternating current to direct current by the AC/DC converter 110 is supplied to the client 200 via the bus line 10. Note that the inductor 140 and the switch 150 are provided between the AC/DC converter 110 and one of the bus lines 10, as shown in FIG. 2. The inductor 140 is provided such that impedance on a communication path is not lowered by a bypass condenser that is normally provided in an output portion of the AC/DC converter 110. Further, the switch 150 is provided in order that electric power is not suddenly output from the power supply server 100 to the bus line 10.

The server controller 120 is a control portion to execute various functions in order to supply electric power by the power supply server 100. The server controller 120 is formed, for example, of a micro processor and peripheral circuits to operate the micro processor. Controls executed by the server controller 120 include, for example, control of whether or not to connect electric power supplied from the AC/DC converter to the bus line 10 and control of a communication protocol for communication with the client 200. In addition, controls executed by the server controller 120 include, for example, control of transmission and reception of information signals to and from the client 200. Furthermore, the server controller 120 is provided with a storage portion (not shown in the figures), which stores, as internal information, the electric power specification (a server profile), a protocol for the information signals, and information of the client 200 acquired by communication and so on.

The modem 130 makes possible the transmission and reception of information signals between the power supply server 100 and the client 200 via the bus line 10. In the electric power supplying system 1 according to the present embodiment, information signals and electric power share a same pair of conductors. Thus, so that electrical interference does not occur, it is necessary to separate the information signals and the electric power through frequency division. In the electric power supplying system 1 according to the present embodiment, the transmission and reception of the information signals between the power supply server and the client 200 is performed via the bus line 10. The transmission and reception of the information signals is performed using a sufficiently high frequency bandwidth, such that electrical interference does not occur with a frequency bandwidth that is used to deliver the electric power (a low frequency bandwidth of around 400 Hz or below, for example). The modem 130 performs signal modulation and demodulation in the transmission and reception of the information signals, which are performed using the sufficiently high frequency bandwidth.

The structure of the power supply server 100 according to the embodiment of the present invention is explained above. Next, a structure of the client 200 according to the embodiment of the present invention will be explained.

[3] Structure of Client

Figure 3:
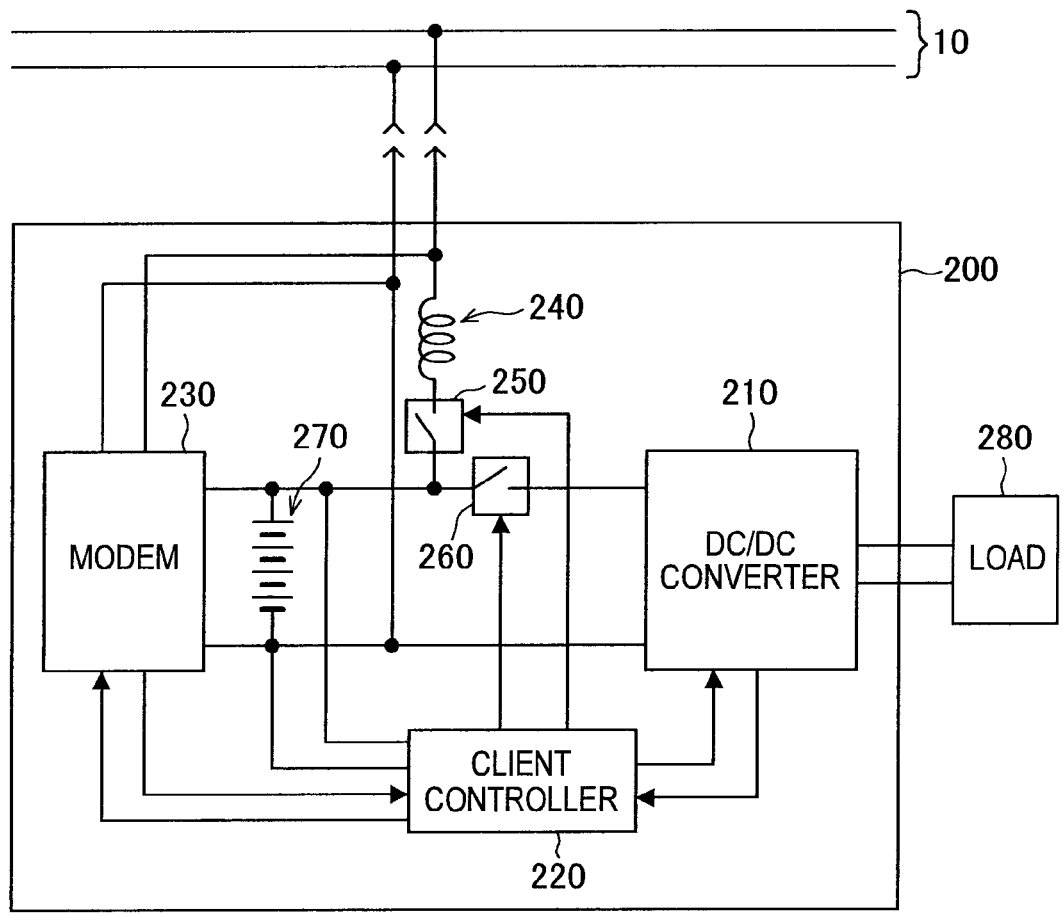
FIG. 3 is an explanatory diagram illustrating a structure of a client 200 according to the embodiment of the present invention.

FIG. 3 is an explanatory diagram illustrating the structure of the client 200 according to the embodiment of the present invention. Hereinafter, the structure of the client 200 according to the embodiment of the present invention will be explained with reference to FIG. 3.

As shown in FIG. 3, the client 200 according to the embodiment of the present invention includes a DC/DC converter 210, a client controller 220, a modem 230, an inductor 240, switches 250 and 260 and a battery 270.

The DC/DC converter 210 converts the direct current electric power supplied from the power supply server 100 to an electric current and voltage required by a load 280 that is connected to the client 200. Further, as shown in FIG. 3, the inductor 240 and the switches 250 and 260 are provided between the DC/DC converter 210 and one of the bus lines 10. The inductor and switches function similarly to the inductor 140 and the switch 150 of the above-described power supply server 100.

The client controller 220 executes various functions in order for the client 200 to receive the electric power supply. Similarly to the above-described server controller 120, the client controller 220 is formed, for example, of a micro processor and peripheral circuits to operate the micro processor. The client controller 220, for example, determines how to consume the electric power supplied from the power supply server 100 and performs control of a protocol used in communication of information signals to and from the power supply server 100. Further, the client controller 220 is provided with a storage portion (not shown in the figures), which stores, as internal information, a protocol for the transmission and reception of the information signals, client information relating to the specification of the client 200 (a client power profile) and so on.

The modem 230 makes possible the transmission and reception of information signals between the power supply server 100 and the client 200 via the bus line 10. In a similar manner to the above-described modem 130, the modem 230 performs signal modulation and demodulation in the transmission and reception of the information signals, which are performed using the sufficiently high frequency bandwidth.

Note that when the consumed electric power of the load 280 is zero or is low, the client 200 can accumulate the electric power supplied by the power supply server 100 in the battery 270.

The structure of the client 200 according to the embodiment of the present invention is explained above.

[4] Problem when Connecting Electric Power Supplying Systems to Each Other

Here, let us consider a case in which the electric power supplying system 1 shown in FIG. 1 and the electric power supplying system 2 are connected via the bus lines 10 and 11. As described above, it is conceivable that one of the electric power supplying systems can be connected to another of the electric power supplying systems by mutually connecting bus lines. However, as electric power is output from the power supply servers 100 and 101 to each of the electric power supplying systems at a specific timing, and therefore, if the bus lines are suddenly mutually connected and the two electric power supplying systems are connected, there is a problem of conflict between the electric power outputs.

The above-described problem will be explained more specifically with reference to FIG. 1, as follows. In FIG. 1, the bus lines 10 and 11 are each formed of two conductors. Thus, when the bus lines 10 and 11 are connected, a two-pin connector is used, for example. However, if a length of the pins is the same, the two conductors that form the bus lines are connected simultaneously. If the two conductors are connected simultaneously, there is a risk of conflict between the electric power outputs of the power supply server 100 and the power supply server 101.

In the electric power supplying systems 1 and 2, high frequency information is superimposed on the electric power supplied from a direct current power source or from a low frequency alternating current power source, and flows through the bus lines 10 and 11. In a state in which only one of the conductors that form the bus lines 10 and 11 is connected, the electric power supplied from a direct current power source or from a low frequency alternating current power source is not supplied. However, the high frequency information can flow through the bus lines even in a state in which only one of the conductors that form the bus lines 10 and 11 is connected.

Here, the embodiment of the present invention has a feature in that a connector that connects the bus lines 10 and 11 is structured such that the conductors forming the bus lines 10 and 11 are connected one at a time, by providing a time difference. Hereinafter, a structure of a plug and a connector that are used to connect the plurality of electric power supplying systems, and communication processing performed when the plug and connector are used to connect to another of the electric power supplying systems will be explained.

Figure 4:
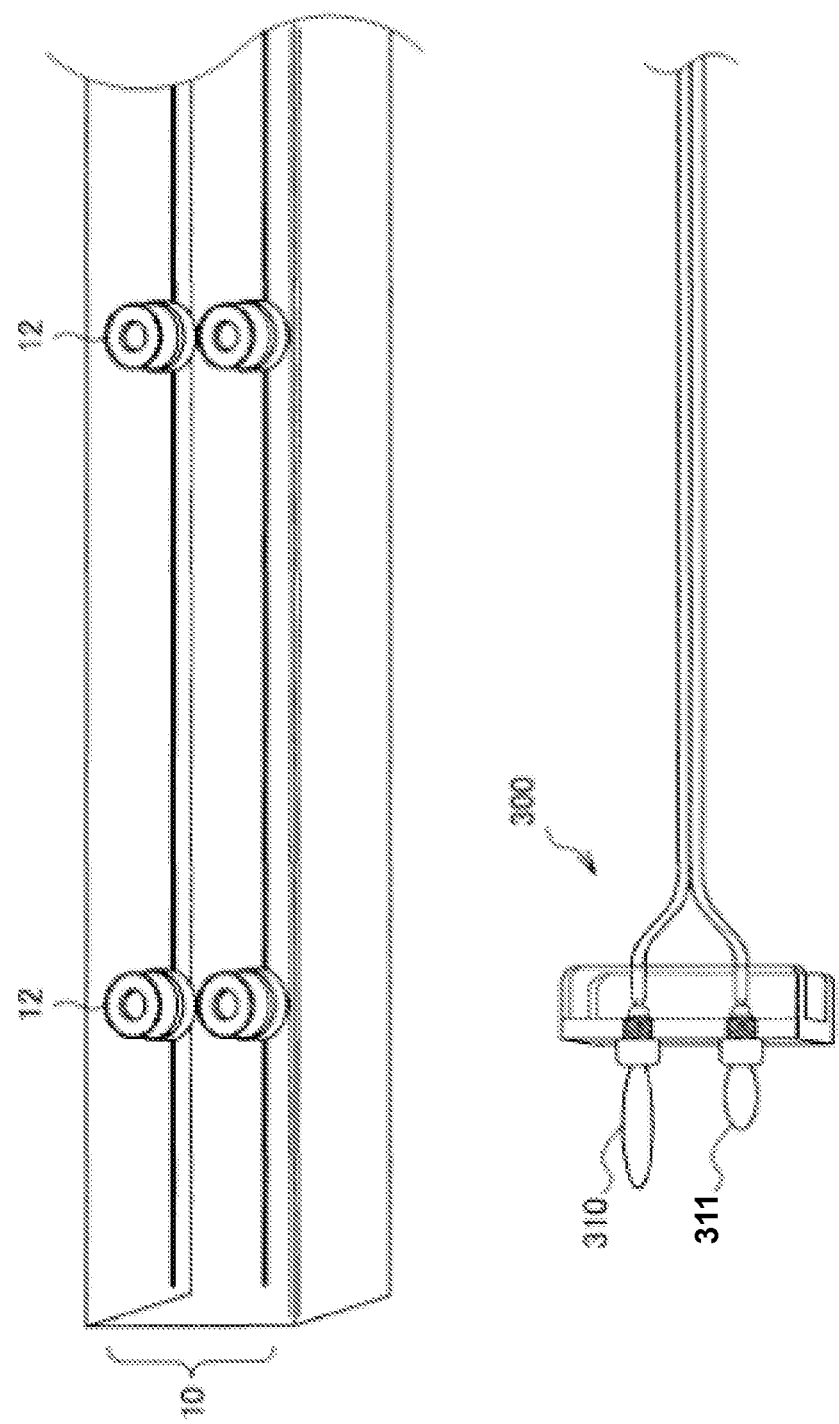
FIG. 4 is an explanatory diagram showing a connector 300 according to the embodiment of the present invention that is used to connect the electric power supplying systems to each other.

[5] Example of Structure of Connector to Connect Plurality of Electric Power Supplying Systems First, an example of a structure of a connector used to connect the bus lines 10 and 11 will be explained. FIG. 4 is an explanatory diagram showing a connector 300 according to the embodiment of the present invention that is used to connect the electric power supplying systems to each other. FIG. 4 further shows jacks 12 that are provided on the bus line 10.

As shown in FIG. 4, the connector 300 is formed including pins 310 and 311 that have different lengths. By inserting the connector 300 shown in FIG. 4 into the jacks 12, it is possible to first cause only the pin 310 to conduct to the bus line 10, and after that, by further inserting the connector 300 fully into the jacks 12, it is possible to also cause the pin 311 to conduct to the bus line 10.

As described above, the high frequency information can flow through the bus line even in a state in which only one of the conductors is connected. Therefore, in the electric power supplying systems 1 and 2, when the connector 300 is inserted into the jacks 12, in a state in which only the one pin 310 conducts to the bus line 10, the high frequency information can be caused to flow through the bus lines 10 and 11.

If a communication path is established between the different electric power supplying systems when the one pin 310 of the connector 300 conducts to the bus line 10, it is preferable to rapidly stop the electric power supply from the power supply servers of both the electric power supplying systems, and to stop the electric power reception of the client. Hereinafter, an example will be explained of a communication protocol to stop the electric power supply from the power supply servers and stop the electric power reception of the client.

[6] Example of Communication Protocol

First, an example of electric power supply processing in the electric power supplying system 1 according to the embodiment of the present invention will be explained. With respect to the electric power supply processing of the electric power supplying system 1 according to the embodiment of the present invention, it is preferable, for example, to also refer to an invention, disclosed in Japanese Patent Application Publication No. JP-A-2008-123051, by the same inventor as the present application. In the electric power supplying system 1 according to the embodiment of the present invention, the electric power supply processing from the power supply server 100 to the client 200 is performed based on synchronous packets that are periodically output from the power supply server 100 to the bus line 10. The synchronous packets are transmitted, for example, at 1.1 second intervals. The client 200 is aware of the existence of the power supply server 100 by the synchronous packets delivered through the bus line 10, and can access the power supply server 100. When the power supply server 100 receives access from the client 200, the power supply server 100 transmits its own address to the client 200. When the client 200 receives the address of the power supply server 100, the client 200 transmits to the power supply server 100, addressed to the received address, an information signal that requests the supply of electric power. When the power supply server 100 receives the information signal requesting the supply of electric power from the client 200, the power supply server 100 supplies the electric power to the client 200.

Figure 11:
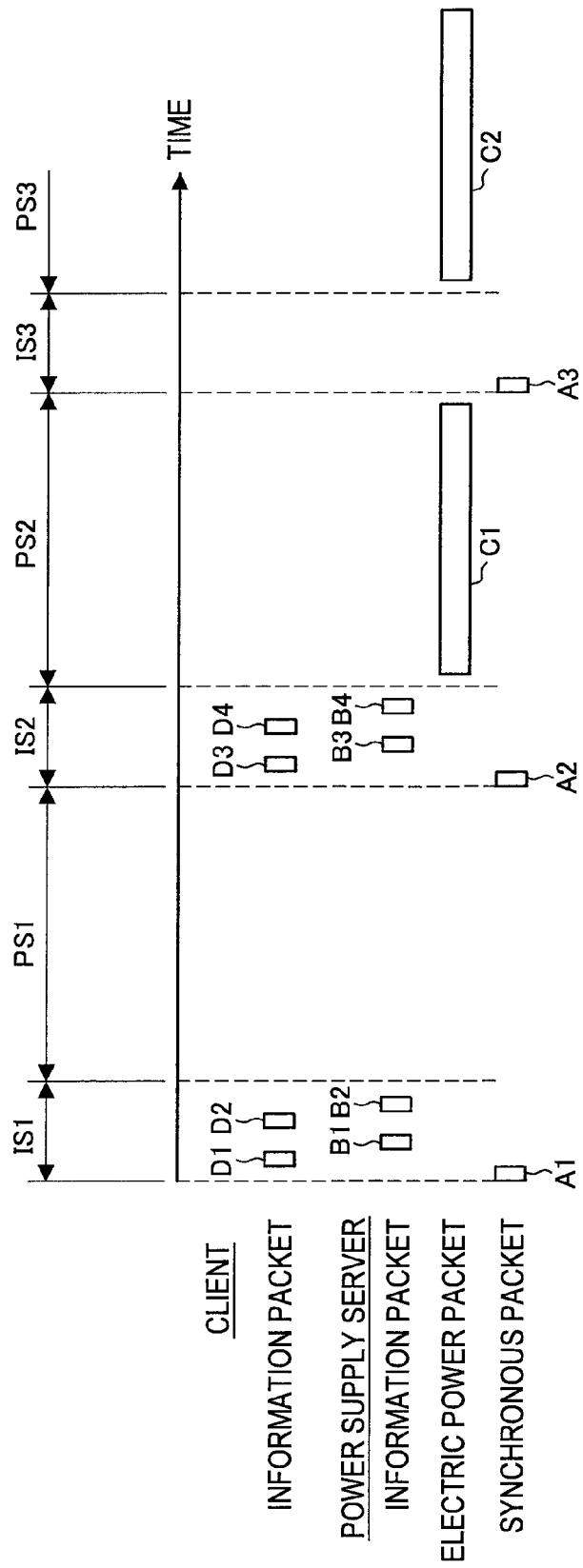
FIG. 11 is an explanatory diagram illustrating electric power supply processing by the electric power supplying system according to the embodiment of the present invention.

FIG. 11 is an explanatory diagram illustrating the electric power supply processing by the electric power supplying system 1 according to the embodiment of the present invention. Hereinafter, the electric power supply processing of the electric power supplying system 1 according to the embodiment of the present invention will be explained in more detail with reference to FIG. 11.

As shown in FIG. 11, the power supply server 100 periodically outputs synchronous packets A1, A2, A3 and so on to the bus line 10. Further, in order to supply electric power to the client 200, the power supply server 100 outputs information packets B1, B2, B3 and so on, which are information signals transmitted and received to and from the client 200, and also outputs electric power packets C1, C2, C3 and so on, which are packetized electric power energy. Meanwhile, in order to receive the supply of electric power from the power supply server 100, the client 200 outputs information packets D1, D2, D3 and so on, which are information signals transmitted and received to and from the power supply server 100.

The power supply server 100 outputs the synchronous packets A1, A2, A3 and so on at a start time of a time slot of a predetermined interval (a one second interval, for example). The time slot is formed of an information slot in which an information packet is transmitted, and an electric power slot in which an electric power packet is transmitted. Information slots IS1, IS2, IS3 and so on are intervals during which exchange of the information packets is performed between the power supply server 100 and the client 200. Further, power supply slots PS1, PS2, PS3 and so on are intervals in which the electric power packets C1, C2, C3 and so on supplied from the power supply server 100 to the client 200 are output. The information packets are packets that can only be output in the intervals of the information slots IS1, IS2, IS3 and so on. Therefore, when it is not possible to complete transmission and reception of the information packet during one of the information slots, the information packet is transmitted over a plurality of the information slots. Meanwhile, the electric power packets are packets that can only be output in the intervals of the power supply slots PS1, PS2, PS3 and so on.

The power supply server 100 has one, or two or more, server power profiles that indicate an electric power specification at which the power supply server 100 itself can supply electric power. The client 200 receives the supply of electric power from the power supply server 100 that is able to supply the electric power that matches a specification of the client 200. At this time, the client 200 acquires the server power profiles from the power supply server 100 and decides the specification of the power supply server 100 (the server power profile) for itself. At that time, first, the client 200 detects the synchronous packet A1 output by the power supply server 100 and acquires the address of the power supply server 100 that is included in the synchronous packet A1. The address can be, for example, a MAC address. Next, the client 200 transmits the information packet D1 to the power supply server 100 to request transmission of a number of the server power profiles that the power supply server 100 has.

When the power supply server 100 receives the information packet D1, the power supply server 100 transmits, in the information packet B1, a server power profile number that is the number of server power profiles that the power supply server 100 has. When the client 200 receives the information packet B1, the client 200 acquires, from the power supply server 100, content of the server power profiles for the number of server power profiles of the power supply server 100. For example, when the power supply server 100 has two server power profiles, the client 200 first acquires an initial one of the server power profiles. When the client 200 acquires the initial one of the server power profiles, the client 200 transmits to the power supply server 100, as the information packet D2, a request to use electric power.

When the power supply server 100 receives the information packet D2, the power supply server 100 transmits to the client 200, as the information packet B2, a first server power profile that is stored in the storage portion (not shown in the figures) of the server controller 120. When the client 200 receives the information packet B2 from the power supply server 100, the client 200 transmits an information packet in order to acquire a second server power profile. However, at this point in time, the information slot IS1 ends, and the power supply slot PS1 to transmit a power supply packet starts. Thus, the information packet is transmitted in the next information slot IS2. Further, in the power supply slot PS1, as the client 200 has not confirmed the electric power supply specification to receive the supply from the power supply server 100, electric power supply is not carried out.

When the power supply slot PS1 ends, the synchronous packet A2 indicating the start of the next time slot is output from the power supply server 100. After that, when the client 200 receives the information packet B2 from the power supply server 100, the client 200 transmits, as the information packet D3, information to acquire the second server power profile.

When the power supply server 100 receives the information packet D3, the power supply server 100 transmits to the client 200, as the information packet B3, the second server power profile that is stored in the storage portion (not shown in the figures) of the server controller 120. When the client 200 receives the information packet B3 and acquires the two server power profiles that the power supply server 100 has, the client 200 selects the server power profile of the power supply specification that is compatible with itself. The client 200 then transmits, to the power supply server 100, an information packet D4 that causes the selected server power profile to be confirmed.

When the power supply server 100 receives the information packet D4, in order to notify the client 200 that the first server power profile has been confirmed, the power supply server 100 transmits, as an information packet B4 to the client 200, information representing a response that indicates that the electric power supply specification has been confirmed. After that, when the information slot IS2 ends and the power supply slot PS2 starts, the power supply server 100 outputs the power supply packet C1 to the client 200 and performs supply of electric power. Note that, with respect to a transmission timing of the electric power packet, an electric power supply start time can be specified from the client 200 to the power supply server 100 by using information representing a transmission start time setting request.

In this way, in known art, the client 200 carries out negotiations with the power supply server 100 during the information slot, and when the client 200 acquires a right to receive electric power from the power supply server 100 in the next electric power slot, when the power supply slot starts, an electric power reception circuit is unconditionally closed. In the present embodiment, this specification is partially changed, and as long as the client does not receive a synchronous packet that is transmitted from a synchronous server, which is detected at a start of communication, the electric power reception circuit is not closed and remains on stand-by. Note that the synchronous packet may include a transmission source MAC address, and the client may refer to the MAC address in order to judge from which synchronous server an electric power part of the packet is transmitted. Further, when a synchronous packet is received from a synchronous server that is not registered with the client, the client immediately opens the switches 250 and 260 and opens the circuit. This is because it is indicated that the bus line has been connected with the bus line of the different electric power supplying system (a hot connection has been made). With this specification, it is possible to prevent mistaken reception of electric power packets from the other electric power supplying system at the time of a hot connection.

In the known electric power supplying systems, the synchronous packets are sent at an interval of approximately 1.1 seconds. However, with the synchronous packets only, it takes too long to detect the hot connection. Here, in the present embodiment, beacon packets are defined and the beacon packets are used to detect the hot connection.

Figure 5:
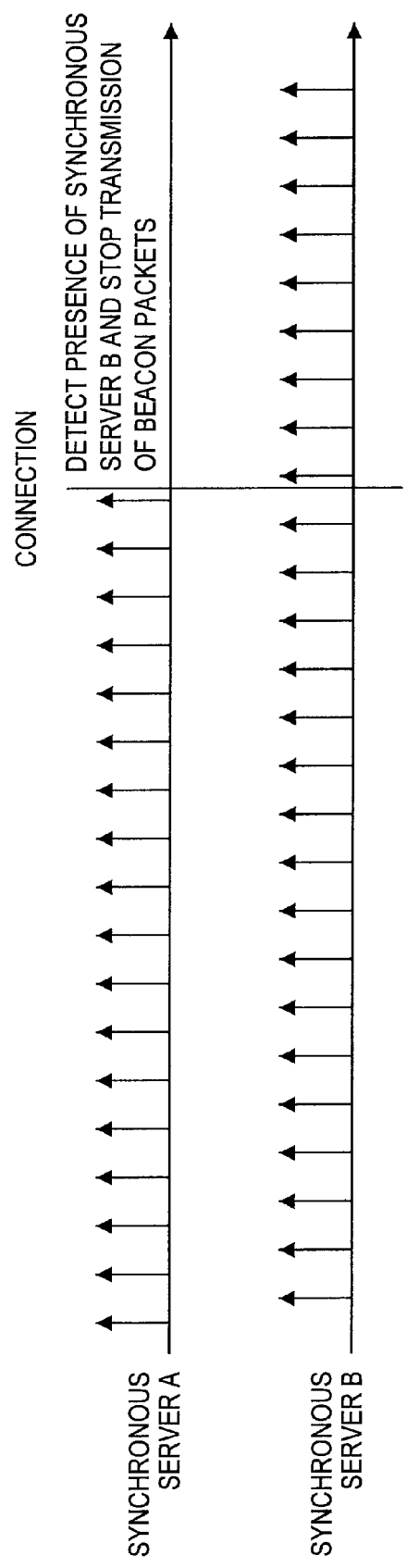
FIG. 5 is an explanatory diagram showing beacon packets transmitted by the power supply server in the electric power supplying system according to the embodiment of the present invention.

FIG. 5 is an explanatory diagram showing beacon packets transmitted by the power supply servers 100 and 101 of the electric power supplying system according to the embodiment of the present invention. In the present embodiment, the power supply servers 100 and 101 each forward the beacon packets during the electric power transmission period at 50 millisecond intervals. It should be noted that the beacon packet format is the same as that of the synchronous packets, and it is necessary to make a distinction from the synchronous packets by setting a power supply packet type value to a value that is different to a value allocated to the synchronous packets. Depending on content of the received beacon packets, the clients 200 and 201 determine whether to receive the electric power packet or to discard the electric power packet. When the clients 200 and 201 have the electric power reception circuits closed and are in a state to receive electric power, when a beacon packet having an unknown MAC address is received, the clients 200 and 201 immediately open the electric power reception circuits and abandon reception of electric power in that power supply slot. Further, when the plurality of the electric power supplying systems are connected, this results in a change in the synchronous server. Thus, after the clients 200 and 201 perform update processing to a new synchronous server address, the clients 200 and 201 are on stand-by for synchronous packets addressed to themselves transmitted from the new synchronous server.

When the two different electric power supplying systems are dynamically coupled, two of the synchronous servers exist in the system. When two or more of the synchronous servers simultaneously exist in one of the electric power supplying systems, this invites confusion in the communication protocols. Therefore, apart from one of the synchronous servers, it is necessary for the other synchronous server(s) to abandon their role as synchronous server. For that reason, in the present embodiment, the synchronous server that first receives the synchronous packet other than of itself, or receives the beacon packet from the power supply server not under its own control, stops transmission of subsequent synchronous packets and abandons the role as the synchronous server. Further, at a timing of the next information slot, the synchronous server that has abandoned the role as the synchronous server broadcasts over the electric power supplying system a notification of the change of the synchronous server.

In accordance with reception of the notification of the change of the synchronous server, the power supply server and the client that are under the control of the synchronous server that has abandoned the role of the synchronous server update the address of the synchronous server, which is stored internally in each of the power supply server and the client, to the address of the new synchronous server. Subsequently, operations are performed in accordance with the synchronous packets transmitted from the new synchronous server. Here, a same packet as the synchronous packet can be used as the notification of the change of the synchronous server that is transmitted from the synchronous server that has abandoned the role of the synchronous server. At this time, it is preferable that a power supply packet type value is set to be different to the values allocated to the synchronous packet and to the beacon packet.

Note that in the electric power supplying system for which a hot connection is prerequisite, when the client is receiving electric power, or when the power supply server is supplying electric power, it is necessary to avoid a different type of electric power being superimposed. Therefore, in the present embodiment, although the transmission interval of the beacon packets is 50 milliseconds, it is preferable that this beacon packet transmission interval be an interval that allows a margin with respect to a mechanical connection of the connector to the bus lines.

Figure 12:
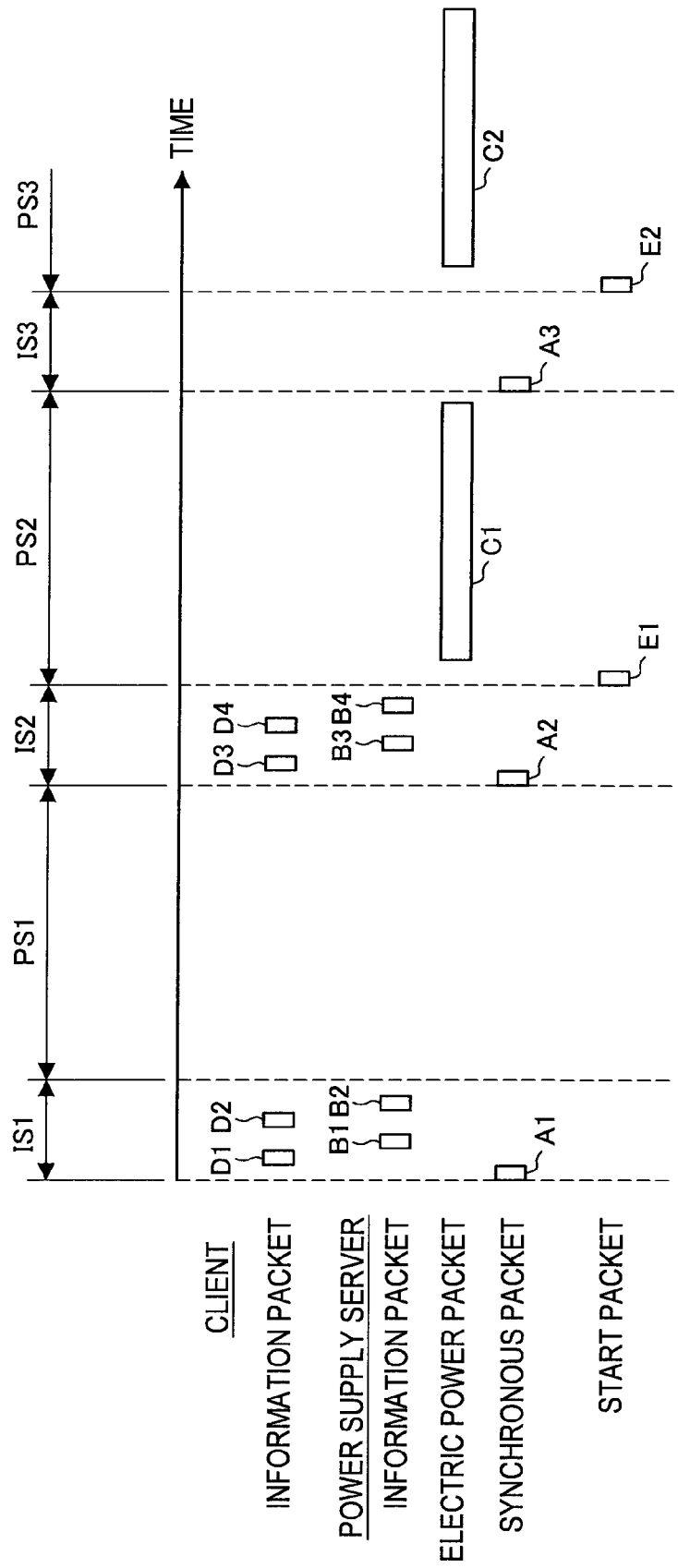
FIG. 12 is an explanatory diagram showing a case in which start packets are sent immediately before sending of electric power packets.

In addition, in the electric power supplying system for which a hot connection is prerequisite, as in the present embodiment, immediately before transmission of the electric power packet based on which the electric power is supplied, a start packet may be transmitted from the synchronous server that indicates that the electric power packet will be transmitted. By sending the start packet from the synchronous server immediately before the transmission of the electric power packet, and by preparations to receive the electric power being started by the client that has received the start packet, it is possible to shorten a protection period with respect to electric power being supplied from the different system. FIG. 12 is an explanatory diagram showing start packets E1, E2 and so on being sent by the synchronous server immediately before transmission of the electric power packets. In this way, by sending the start packets immediately before the transmission of the electric power packets, and by the client receiving the start packets, the client can ascertain that supply of the electric power from the power supply server will start. Note that the format of the start packet may be the same as the format of the synchronous packet.

The operations of the two electric power supplying systems at the time of the above-described hot connection are shown in Table 1 below. In the table below, the electric power supplying system 1 is referred to as System A and the electric power supplying system 2 is referred to as System B, and a flow is shown of a case in which the palpitation server A first detects a beacon packet (or a synchronous packet) from the System B.

TABLE 1

(System operation at time of hot connection)

| | System A | Synchronous server A | System B | Synchronous server B |
|---|---|---|---|---|
| 1 | Independent operation | Independent timing operation | Independent operation | Independent timing operation |
| 2 | Hot connection | | | |
| 3 | Detection of system B beacon packet (or synchronous packet) | | | |
| 4 | Main switch open | Operation stopped | Operation continued | Operation continued |
| 5 | Stand-by | Notification of change of synchronous server | Operation continued | Operation continued |
| 6 | Change of synchronous server | Start of power supply server operation | Operation continued | Operation continued |

By forming the communication protocol in the manner described above, at a time point at which one of the pins 310 of the connector 300 conducts to the bus line 10 and the communication path is established between the different electric power supplying systems, it is possible to stop the electric power supply from the power supply server and to stop reception of the electric power by the client. It should be noted that, in the above explanation, a case is shown in which, in each of the electric power supplying systems, the synchronous server functions are provided in each of the power supply servers, but it goes without saying that the present invention is not limited to this example. In each of the electric power supplying systems, the synchronous server may be provided separately to the power supply server, and each of the packets may be sent from the synchronous server.

Next, a modified example of the connector used to connect the different electric power supplying systems will be explained.

Figure 6:
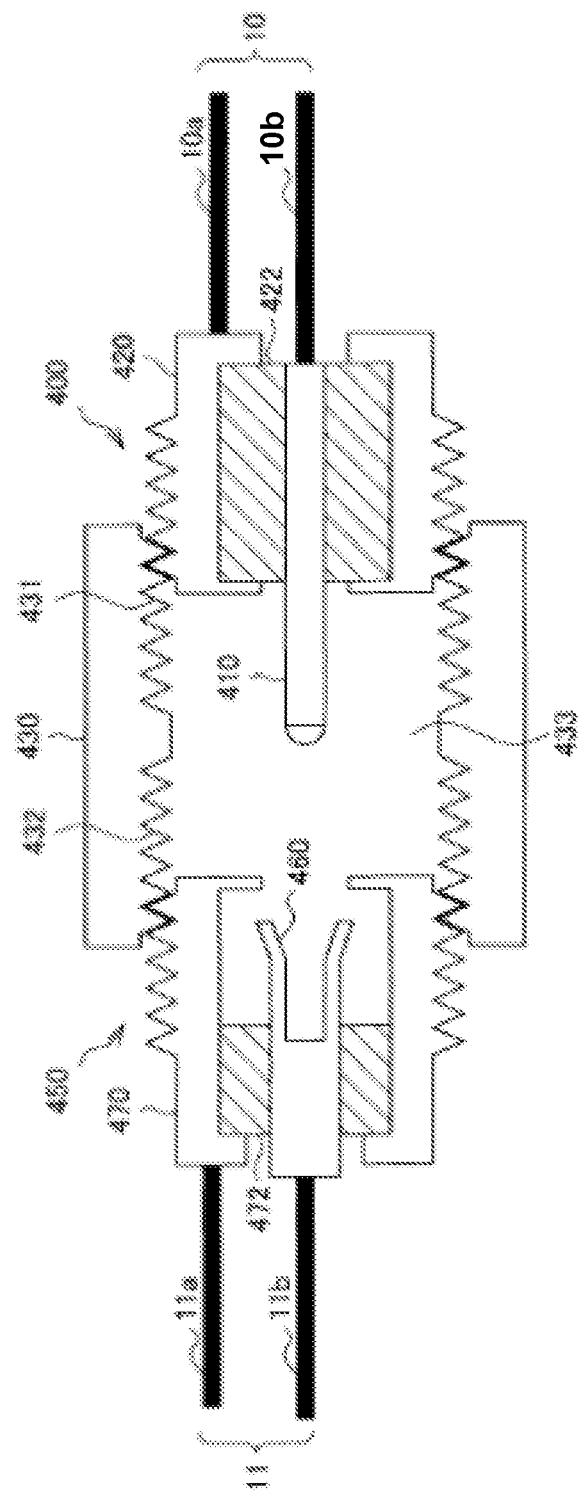
FIG. 6 is an explanatory diagram illustrating a shape of a cross section of a connector used to connect the different electric power supplying systems to each other.
Figure 7:
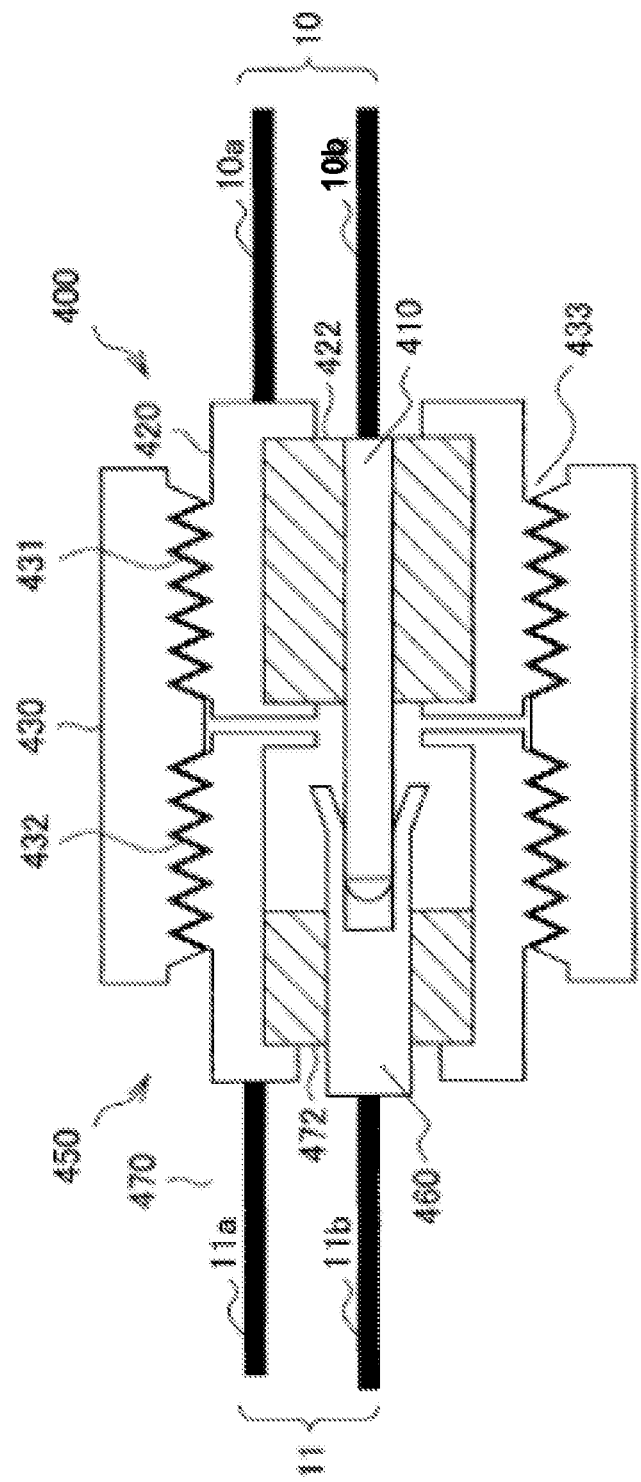
FIG. 7 is an explanatory diagram illustrating a shape of a cross section of the connector used to connect the different electric power supplying systems to each other.

[7] Modified Examples of Connector Used to Connect Plurality of Electric Power Supplying Systems FIG. 6 and FIG. 7 are explanatory diagrams illustrating shapes of cross sections of connectors 400 and 450 according to the embodiment of the present invention, which are used to connect different electric power supplying systems. Hereinafter, the connectors 400 and 450 according to the embodiment of the present invention, which are used to connect the different electric power supplying systems, will be explained with reference to FIG. 6 and FIG. 7.

The connector 400 is a male connector, and the connector 450 is a female connector. The connector 400 and the connector 450 can be connected to each other by being screwed into a screw 430 that is an example of a joint portion of the present invention. The connector 400 includes a contact 410 and a shell portion 420. The connector 450 includes a contact 460 and a shell portion 470.

The contacts 410 and 460 are formed of conductive bodies. By making the connectors 400 and 450 have contact with the contact 460 of the connector 450, a conductor 10b of the bus line 10 is connected with a conductor 11b of the bus line 11. Further, the shell portions 420 and 470 are also formed of conductive bodies. The connectors 400 and 450 can be fixed in place by screwing the shell portions 420 and 470 into a screw hole 433 of the screw 430. In addition, the screw 430 is also formed of a conductive body, and, by screwing the shell portion 420 and 470 into the screw hole 433, a conductor 10a of the bus line 10 is connected with a conductor 11a of the bus line 11. Note that it is preferable for screw grooves 431 and 432, which are used to fix the connectors 400 and 450, are reversely threaded to each other. Further, it is preferable to provide insulation portions 422 and 472 around the contacts 410 and 460, such that the contacts 410 and 460 do not conduct via the screw 430.

In a state in which the connectors 400 and 450 are simply inserted into the screw 430, as shown in FIG. 6, the contacts 410 and 460 are in a state in which they do not have contact with each other, and this is a state in which only the conductor 10a of the bus line 10 is connected with the conductor 11a of the bus line 11. Thus, in the state shown in FIG. 6, only communication using a high frequency is established, and delivery of electric power by direct current or by low frequency alternating current is not performed.

After that, if the connectors 400 and 450 are screwed into the screw hole 433 and the contacts 410 and 460 have contact with each other as shown in FIG. 7, the conductor 10b of the bus line 10 is connected to the conductor 11b of the bus line 11. In the state shown in FIG. 7, the two conductors of the bus lines 10 and 11 are connected, and both the communication using the high frequency and the delivery of electric power by direct current or by low frequency alternating current are performed.

By forming the connectors 400 and 450 as shown in FIG. 6 and FIG. 7, the conductors of the bus lines 10 and 11 are connected with a respective time difference. Therefore, by forming the connectors 400 and 450 as shown in FIG. 6 and FIG. 7, when connecting the different electric power supplying systems, first, the communication path is established. Then, when the communication path is established, the supply of electric power from the power supply server can be stopped and the reception of the electric power by the client can be stopped, as described above. It should be noted that the time difference when connecting each of the conductors of the bus lines 10 and 11 depends on the length of the screw 430, and the time difference can be adjusted by adjusting the length of the screw 430.

Figure 8:
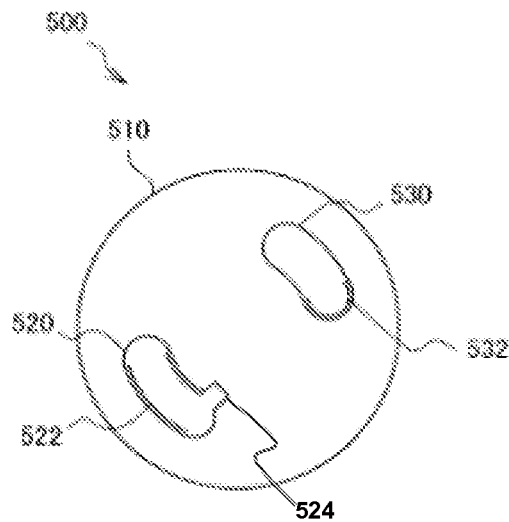
FIG. 8 is an explanatory diagram illustrating a shape of a cross section of a connector used to connect the different electric power supplying systems to each other.
Figure 9:
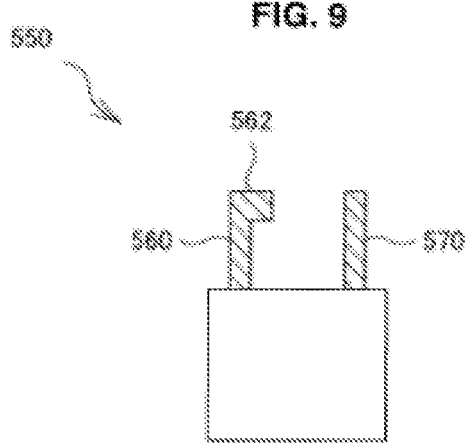
FIG. 9 is an explanatory diagram illustrating a shape of a plug used to connect the different electric power supplying systems to each other.

FIG. 8 is an explanatory diagram showing a structure of a female connector 500 according to the embodiment of the present invention, which is used to connect the different electric power supplying systems. Further, FIG. 9 is an explanatory diagram showing a structure of a plug 550 according to the embodiment of the present invention, which is used to connect the different electric power supplying systems.

The female connector 500 is formed such that the plug 550, which is a male connector and which will be described later, can be inserted into the female connector 500. The female connector 500 includes a housing 510 and arc-shaped electrode holes 520 and 530. A female electrode 522 is provided in the electrode hole 520 and a female electrode 532 is provided in the electrode hole 530. The female electrode 522 connects to one of the conductors forming the bus line and is provided in the electrode hole 520 along a circumferential direction of the connector 500, as shown in FIG. 8. Meanwhile, the female electrode 532 is connected to the other of the conductors that is different to the above-described conductor and that forms the bus line, and is provided in a half-circle shape on one side of the electrode hole 530, as shown in FIG. 8. Then, the connector 500 has a protruding portion 524 on the arc shaped electrode receiving hole 520 only, as shown in FIG. 8.

On the other hand, the plug 550 is formed such that it can be inserted into the connector 500, and includes male electrodes 560 and 570. The male electrodes 560 and 570 respectively connect to one of the conductors that form the bus line. Then, the plug 550 is provided with a protrusion 562 on the male electrode 560 only, as shown in FIG. 9. By providing the protrusion 562, it is possible to insert, respectively, the male electrode 560 of the plug 550 into the electrode hole 520 and the male electrode 570 into the electrode hole 530.

Figure 10:
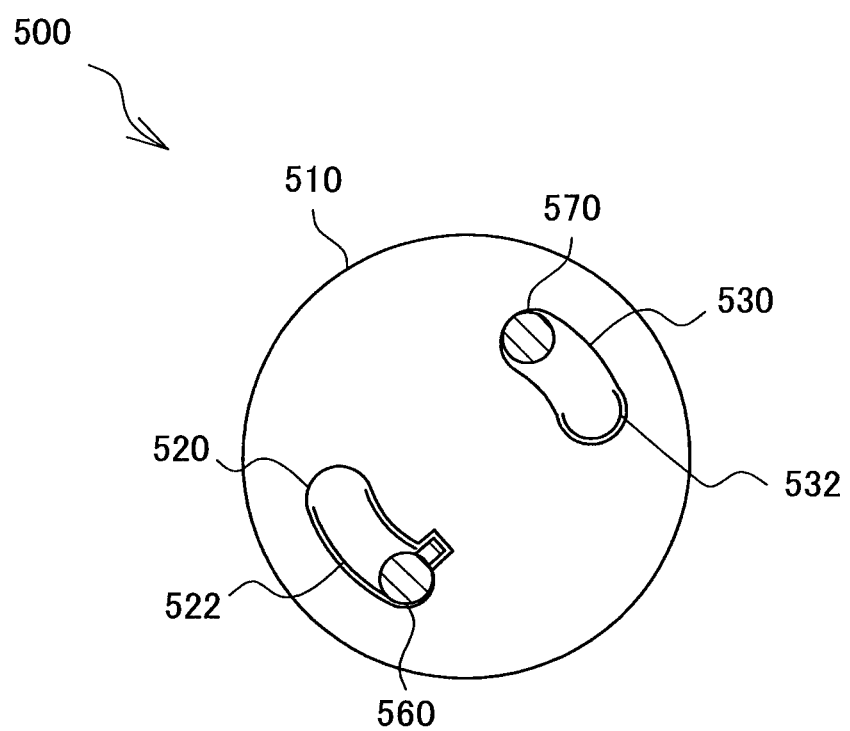
FIG. 10 is an explanatory diagram showing a state in which the connector is inserted into the plug.

By providing the connector 500 and the plug 550 in this way, the two conductors that form the bus line can be connected with a time difference. In other words, as shown in FIG. 10, at a time at which the connector 500 is inserted into the plug 550, only the male electrode 560 and the female electrode 522 have contact with each other, and in this state, of the two conductors forming the bus line, only one of the conductors is in a connected state. Therefore, at the time at which the connector 500 is inserted into the plug 550, the communication path is established, and when the communication path is established, it is possible to stop the supply of electric power from the power supply server and to stop the reception of the electric power by the client. Then, in a state in which the connector 500 is inserted into the plug 550, if the plug 550 is rotated in a clockwise direction by a predetermined angle, contact is also made between the male electrode 570 and the female electrode 532. By the male electrode 570 and the female electrode 532 having contact with each other, the other one of the conductors is also connected, and thus the delivery of electric power by direct current or by low frequency alternating current is performed.

The modified examples of the connector used to connect the different electric power supplying systems with each other are explained above.

[8] Conclusion

According to the embodiment of the present invention described above, when different electric power supplying systems are connected to each other, each of conductors of bus lines are connected with a time difference, and thus it is possible to connect together the electric power supplying systems that are performing independent operations. As it is possible to connect together the electric power supplying systems that are performing independent operations, convenience in terms of actual use is significantly improved, and use is greatly simplified. Further, by connecting the different electric power supplying systems in this way, devices such as a router to connect the electric power supplying systems are not necessary, and management of a plurality of electric power supplying systems becomes simple.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the above-described embodiment, a structure is described in which one conductor of a bus line is connected at a time point in which a plug to connect two bus lines is inserted into a jack or connector that is provided on the bus line, but the present invention is not limited to this example. For example, the plug and the connector provided on the bus line may be provided with wireless communication functions or non-contact communication functions, and high frequency signals flowing in each of the bus lines may be mutually transmitted between electric power supplying systems when the plug and the connector approach each other within a predetermined distance.

The invention claimed is:

1. An electric power supplying system comprising:
at least two systems each comprising:
a bus line comprising at least two conductors, wherein the bus line carries an information signal representing information superimposed on electric power;
at least one power supply server connected to the bus line and configured to supply the electric power; and
at least one client connected to the bus line and configured to receive the supply of the electric power from the power supply server,
wherein the at least two systems are connected to each other by connecting the bus lines to each other using conductors,
wherein the conductors comprise a connector having at least two electrodes that connect with other of the conductors, wherein one of the electrodes is longer than the other of the electrodes, such that when the connector is connected to the bus line, the one of the electrodes is in contact with the bus line before the other of the electrodes,
wherein the one of the electrodes that is longer than the other of the electrodes causes the information signal to be transferred to the bus line.

2. The electric power supplying system according to claim 1, further comprising a synchronous server that controls the supply of electric power from the power supply server,
wherein the synchronous server periodically transmits detection packets for detecting a connection with other of the at least two systems, and when the synchronous server detects a detection packet transmitted by a synchronous server that is included in the other of the at least two systems, the synchronous server stops transmission of the detection packets and notifies the power supply server and the client of a change in the synchronous server.

3. The electric power supplying system according to claim 2, wherein the synchronous server transmits a start packet, which notifies a start of the supply of the electric power, before the start of the supply of the electric power.

4. The electric power supplying system according to claim 3, wherein the at least one client receives the supply of the electric power from the power supply server based on reception of the start packet.

5. The electric power supplying system according to claim 1, further comprising:
a joint portion provided on the bus line and comprising a screw hole, wherein the joint portion joins connectors of the at least two systems when the connectors are screwed in after being inserted into the screw hole;
wherein only one of the conductors of the bus line is connected by the joint portion when the connectors are inserted into the joint portion, and the other conductor of the bus line is connected when the connectors are screwed into the joint portion.

6. The electric power supplying system according to claim 1,
wherein the connector is a female connector that is provided on the bus line and into which the connector of the other of the at least two systems is inserted,
wherein only one of the electrodes of the connector of other of the at least two systems is connected to the bus line when the connector of the other of the at least two systems is inserted into the female connector, and the other of the electrodes is also connected to the bus line when the connector is rotated by a predetermined angle in a state in which the connector is inserted.

7. The electric power supplying system according to claim 1, wherein the connector causes the information signal to be transferred to the bus line in a state in which only the one of the electrodes is connected to the bus line.

8. The electric power supplying system according to claim 1, wherein the information signal transferred to the bus line comprises high frequency information.

9. An electric power supplying system comprising:
at least two systems each comprising:
a bus line which is formed by at least two conductors and on which an information signal representing information is superimposed on electric power;
at least one power supply server which is connected to the bus line and which supplies the electric power;
at least one client which is connected to the bus line and which receives the electric power from the power supply server, and
a synchronous server that controls the supply of the electric power from the power supply server,
wherein the at least two systems are connected to each other by connecting the bus lines using conductors,
wherein the conductors include a connector having at least two electrodes that connect with each of the conductors forming the bus line,
wherein the connector has a structure in which, when the connector is connected to the bus line, one of the electrodes is connected to the bus line in advance compared to the other electrode, and
wherein the synchronous server periodically transmits detection packets for detecting a connection with the other systems, and when the synchronous server detects a detection packet transmitted by a synchronous server that is included in the other system, the synchronous server stops transmission of the detection packets and notifies the power supply server and the client included in the system of a change in the synchronous server.

10. The electric power supplying system according to claim 9, wherein the synchronous server transmits a start packet, which notifies a start of the supply of the electric power, before the start of the supply of the electric power.

11. The electric power supplying system according to claim 10, wherein the client receives the electric power supply from the power supply server based on reception of the start packet.

12. The electric power supplying system according to claim 9, wherein one of the electrodes that is connected to the bus line in advance is longer than the other electrode.

13. The electric power supplying system according to claim 9, further comprising:
a joint portion comprising a screw hole, wherein the joint portion joins the connectors of the at least two systems when the connectors are screwed in after being inserted into the screw hole;
wherein only one of the conductors is connected by the joint portion when the connectors are inserted into the joint portion, and the other conductor is connected when the connectors are screwed into the joint portion.

14. The electric power supplying system according to claim 9,
wherein the connector is a female connector that is provided on the bus line and into which the connector of the other of the at least two systems is inserted,
wherein only one of the electrodes of the connector of the other of the at least two systems is connected to the bus line when the connector of the other of the at least two systems is inserted into the female connector, and the other electrode is also connected to the bus line when the connector is rotated by a predetermined angle in a state in which the connector is inserted.

15. An electric power supplying system comprising:
at least two systems each comprising:
a bus line which is formed by at least two conductors and on which an information signal representing information is superimposed on electric power;
at least one power supply server which is connected to the bus line and which supplies the electric power; and
at least one client which is connected to the bus line and which receives the electric power from the power supply server,
wherein the at least two systems are connected to each other by connecting the bus lines using conductors,
wherein the conductors include a connector having at least two electrodes that connect with each of the conductors forming the bus line, and
wherein the connector has a structure in which, when the connector is connected to the bus line of the other system, one of the electrodes is connected to the bus line in advance compared to the other electrode; and
a joint portion that is provided on the bus line and comprising a screw hole, wherein the joint portion joins the connectors of the at least two systems when the connectors are screwed in after being inserted into the screw hole,
wherein only one of the conductors of the bus line is connected by the joint portion when the connectors are inserted into the joint portion, and the other conductor of the bus line is connected when the connectors are screwed into the joint portion.

16. The electric power supplying system according to claim 15,
wherein the at least two systems each comprise a synchronous server that controls the supply of electric power from the power supply server, and
wherein the synchronous server periodically transmits detection packets for detecting a connection with other of the at least two systems, and when the synchronous server detects a detection packet transmitted by a synchronous server that is included in the other of the at least two systems, the synchronous server stops transmission of the detection packets and notifies the power supply server and the client of a change in the synchronous server.

17. An electric power supplying system comprising:
at least two systems each comprising:
a bus line which is formed by at least two conductors and on which an information signal representing information is superimposed on electric power;
at least one power supply server which is connected to the bus line and which supplies the electric power; and
at least one client which is connected to the bus line and which receives the electric power from the power supply server,
wherein the at least two systems are connected to each other by connecting the bus lines using conductors,
wherein the conductors include a connector having at least two electrodes that connect with each of the conductors forming the bus line,
wherein the connector has a structure in which, when the connector is connected to the bus line of the other system, one of the electrodes is connected to the bus line of the other system in advance compared to the other electrode,
wherein the connector is a female connector that is provided on the bus line and into which the connector of the other system is inserted, and
wherein only one of the electrodes of the other system is connected to the bus line when the connector of the other system is inserted into the female connector, and the other electrode is also connected to the bus line when the connector is rotated by a predetermined angle in a state in which the connector is inserted.

18. The electric power supplying system according to claim 17,
wherein the at least two systems each comprise a synchronous server that controls the supply of electric power from the power supply server, and
wherein the synchronous server periodically transmits detection packets for detecting a connection with other of the at least two systems, and when the synchronous server detects a detection packet transmitted by a synchronous server that is included in the other of the at least two systems, the synchronous server stops transmission of the detection packets and notifies the power supply server and the client of a change in the synchronous server.

* * * * *